(12) United States Patent
Ueda et al.

(10) Patent No.: US 6,738,791 B2
(45) Date of Patent: May 18, 2004

(54) DATA SYNCHRONIZING DEVICE (75) Inventors: Yuzuru Ueda, Kawasaki (JP); Yuuichi Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 09/955,944

(22) Filed: Sep. 20, 2001

(65) Prior Publication Data
US 2002/0099754 A1 Jul. 25, 2002

(30) Foreign Application Priority Data
Jan. 25, 2001 (JP) ........................................ 2001-016607

(51) Int. Cl.[7] ........................... G06F 17/00; G06F 15/00
(52) U.S. Cl. ............................ 707/203; 707/1; 715/511
(58) Field of Search ........................ 707/1, 7, 10, 100, 707/104.1, 200, 201, 203; 714/4, 6, 12; 345/736; 715/500.1

(56) References Cited

U.S. PATENT DOCUMENTS 6,449,622 B1 * 9/2002 LaRue et al. ............... 707/201
6,611,849 B1 * 8/2003 Raff et al. .................. 707/203

* cited by examiner

Primary Examiner—Alford Kindred
(74) Attorney, Agent, or Firm—Staas & Halsey LLP (57) ABSTRACT

A process is efficiently performed when a synchronization process of personal information management data that is managed on a network is performed. When synchronizing PIM data on a terminal side with group management information on a server side, if the data is to be reflected on the PIM side, the PIM is sequentially accessed each time the synchronization process is performed for each data and a data group is rewritten. On the other hand, when the data is to be reflected in the group management information side of the server, the server is accessed and the data on the server side is rewritten after all the synchronization processing is complete. In this way, by independently performing the rewrite processes for the PIM side and for the server side, respectively, even when there is a difference in the access speeds of the PIM and the server, particularly when delays tend to be caused by accessing the server, restriction on the PIM side may be prevented.

11 Claims, 6 Drawing Sheets

| ID | PROCESSING FLAG | RECOVERY INFORMATION |
|---|---|---|
| E(A) | fA | RA |
| E(B) | fB | RB |
| ⋮ | ⋮ | ⋮ |

DATA SYNCHRONIZING DEVICE

BACKGROUND OF THE INVENTION

1. Field of the Invention

The present invention relates to a technology that is effectively applied to synchronization processing of personal data which is distributively managed by a plurality of systems.

2. Description of the Related Art

An application program namely called PIM (Personal Information Manager) is known for managing personal information such as a personal schedule and an address book on a personal computer. A PIM of this type connects to and shares data with portable information devices called PDA (Personal Data Assistant).

On the other hand, systems referred to as groupware for managing personal information integrally by means of a server between the terminals connected by a network are starting to be exploited effectively.

In groupware such as this, the problem arises of how to synchronize the group management information of the server with the information managed by the PIM on each terminal such as a personal computer.

Here, synchronization means making additions, alterations or deletions of data items on the server or terminal side be reflected in the data on the other side. For example, in the case that a new personal schedule item was added in the PIM on the terminal side, sychronization means adding this added schedule item to the group management information on the server, too.

Synchronization programs introduced so far of this sort compare the data on the server side with the data on the side of the terminals and generate a standard set of data having no inconsistencies. These programs adopted the form of writing simultaneously on all the systems to be the object (server and terminals).

In such a case as this form is adopted, there was a problem that in systems requiring time to write to the server, the processes of writing to the server caused the PIM system on the terminal side to be restricted more than necessary.

Specifically, the above-mentioned problem could become particularly evident in systems that originally place a large load on their server, and in situations where the server and the synchronization program, that is devices to be the object of the synchronization processing are connected by a low-speed line such as a telephone line. Additionally, in the case that the server and the synchronization program are connected by telephone lines, the problem has been pointed out of a danger of lines disconnecting due to noise and the like, an occurrence of data errors due to noise and the like and also of communication cost produced by redialing, etc.

SUMMARY OF THE INVENTION

The present invention has been made in light of such issues, and shortens the time restricting one of the devices when the synchronization process is being conducted. More specifically, the technical object of the present invention is to provide a data synchronization technology that shortens the time restricting the PIM system side during the synchronization process, and also makes recovery processes easier in the event that an obstruction has occurred while writing data on the server side.

The present invention is a system for retaining, via a network, each data group consisting of two pieces or more of data in the same format, in which upon performing synchronization of each data group, the system compares a first data group and a second data group and generates synchronized data; sequentially stores synchronized data in a storing means each time synchronized data is produced; on the one hand, renews the first data group based on the synchronized data each time synchronized data is generated, while on the other hand, waiting for generation of all the synchronized data and reading the synchronized data group from the storage means and updating the second data group.

Here, a data group refers to, for example, personal management information, for example, in a PIM, such as a schedule or an address book, and the first data group is the personal management information used by the PIM program installed on a terminal such as a personal computer. The second data group is, for example, group management information that is managed on the server as groupware. The personal management information and the group management information undergo synchronization processing, and become synchronized data without inconsistencies.

When this synchronized data is to be reflected on the PIM side, that is the first data group, the first data group is sequentially rewritten each time the synchronization processing is performed.

On the other hand, when this synchronized data is to be reflected on the group management information side, that is the second data group, the second data group is rewritten after all the synchronization processing is completed.

In this way, the rewriting of the first data group and rewriting of the second data group are each carried out independently. Therefore, even if there is a difference in the access speed for the two data groups, the data update can be completed without the processing of one influencing the processing of the other.

According to the present invention, it is possible to write the synchronized data to the PIM side and to the server as separate processes. Therefore, the process is not influenced by delays in writing to the server side, and the time restricting the PIM is shortened.

DETAILED DESCRIPTION OF THE PREFERRED EMBODIMENTS

Hereinafter, explanation is made of an embodiment of the present invention with reference to drawings.

Figure 1:
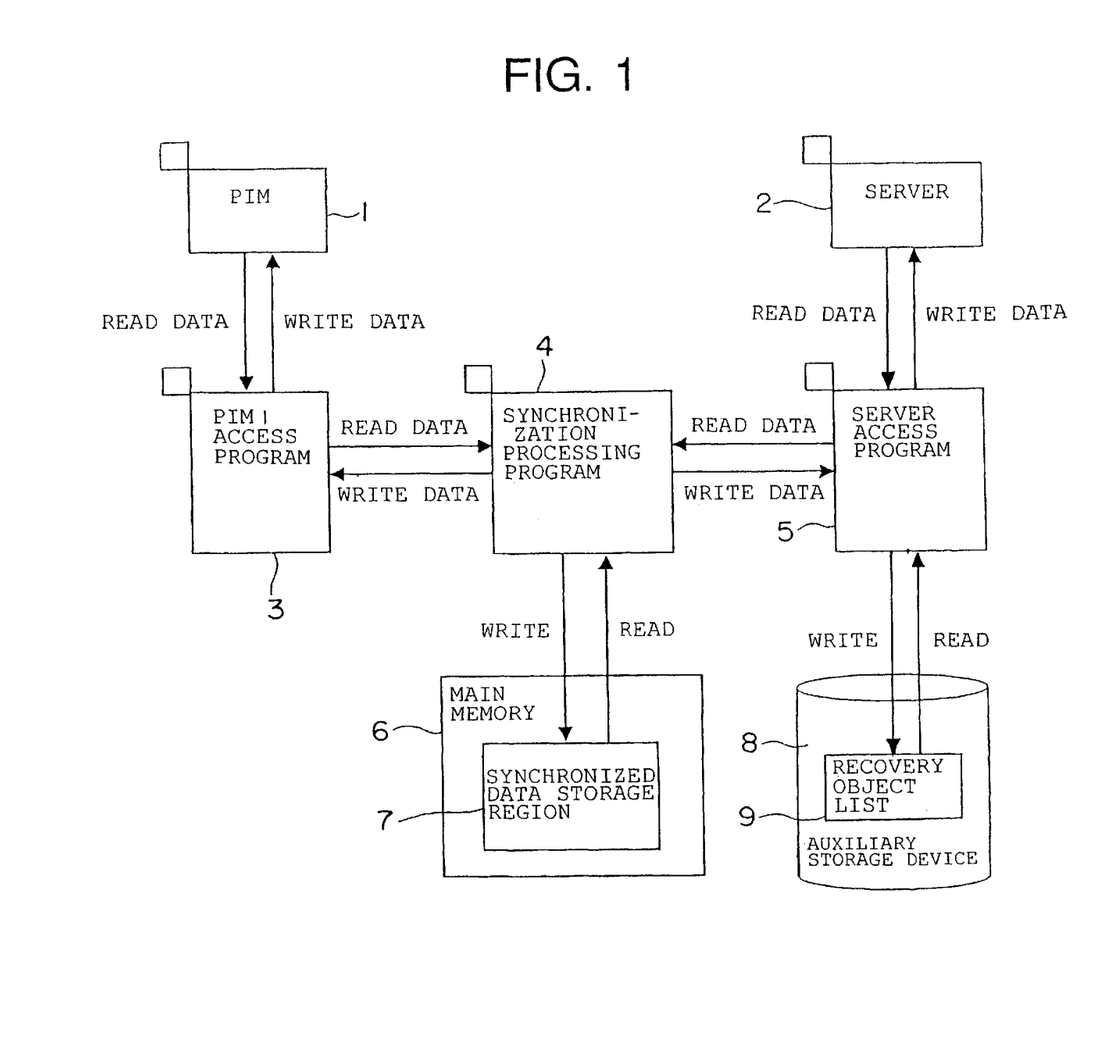
FIG. 1 is a system structural diagram of a data synchronization device according to an embodiment of the present invention.
Figure 2:
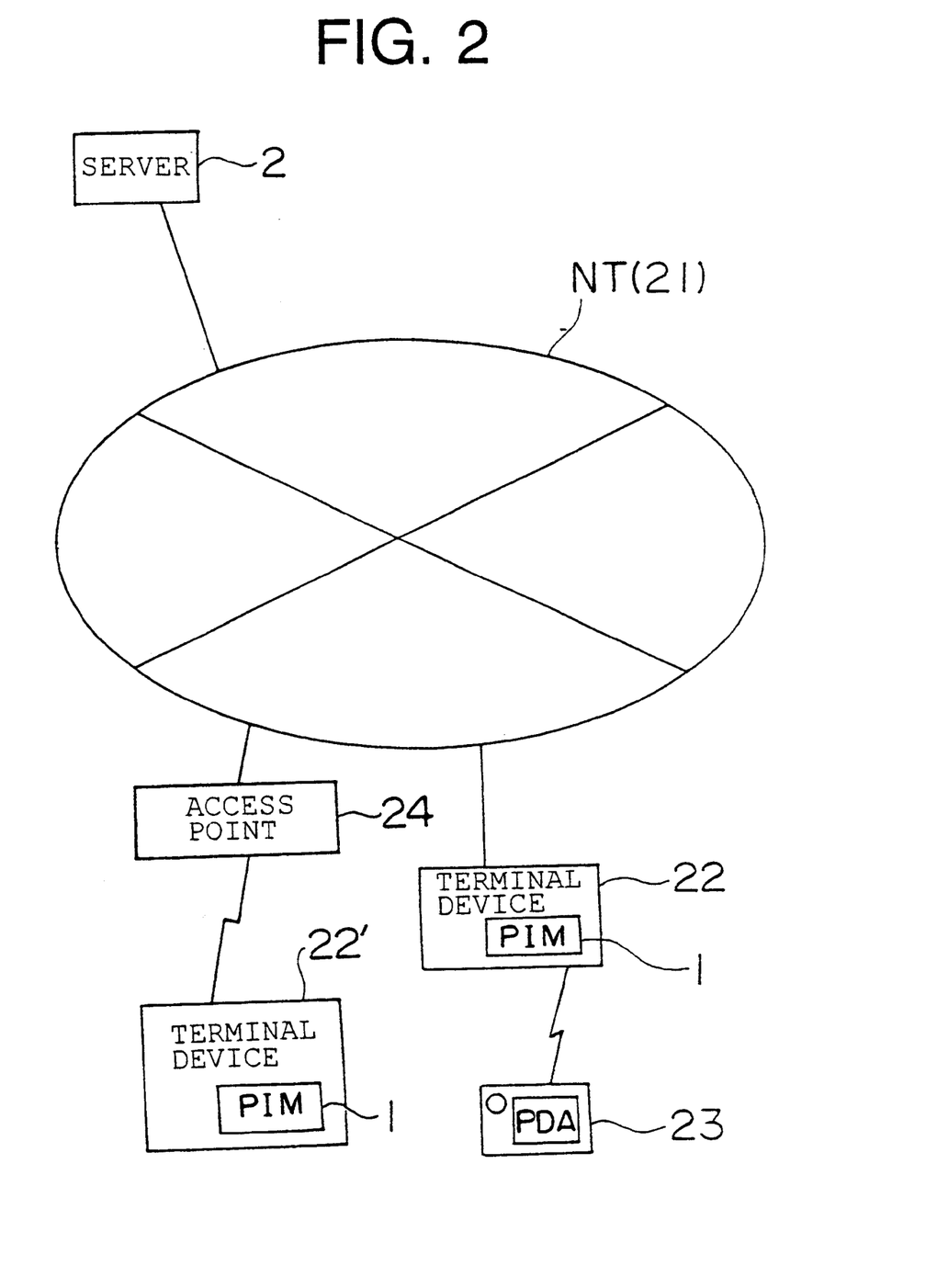
FIG. 2 is a network structural diagram of a data synchronization system.

FIG. 1 is a functional block diagram of a system structure in accordance with the present invention and FIG. 2 is a network structure diagram showing the system structure.

As shown in FIG. 2, a server 2 and a terminal device 22 of this system are connected by means of a network 21. Also, the system is constructed such that a portable information device (PDA: Personal Data Assistant) 23 is connected to the terminal device 22 by means of a cable or by an optical communication. Note that although a detailed explanation is omitted here, a PIM 1 in the terminal device 22 and the portable information device (PDA) 23 are the members on which data synchronization processing is performed.

As shown in FIG. 1, the functions of the present system include a PIM 1 stored as a program inside the terminal device 22, and a PIM access program 3 for accessing this PIM 1. The PIM 1 and the PIM access program 3 are configured inside the terminal device 22. On the other hand, a server access program 5 and a synchronization process program 4 are configured inside the server 2. Furthermore, a synchronized data storage region 7 is provided in the main memory 6 of the server 2, and a recovery object list 9 is configured inside the auxiliary storage device 8 structured by such as a hard disk device. The synchronized data storage region 7 is structured by more specifically, a buffer using the main storage 6 obtained in gaps in the processes of the synchronization processing program 2.

The PIM access program 3 is a program for accessing the PIM 1, and performs reading of data and writing of data after synchronization. The synchronization processing program 4 is a program for synchronizing data obtained using the PIM access program 3 and the server access program 5. Here, synchronization means a process of making data that is newly added, altered or deleted on the PIM 1 also be reflected in the data that is read from the server 2. This also includes a process of making data that is added, altered or deleted on the side of the server 2 be reflected in the data of the PIM 1.

Figure 3:
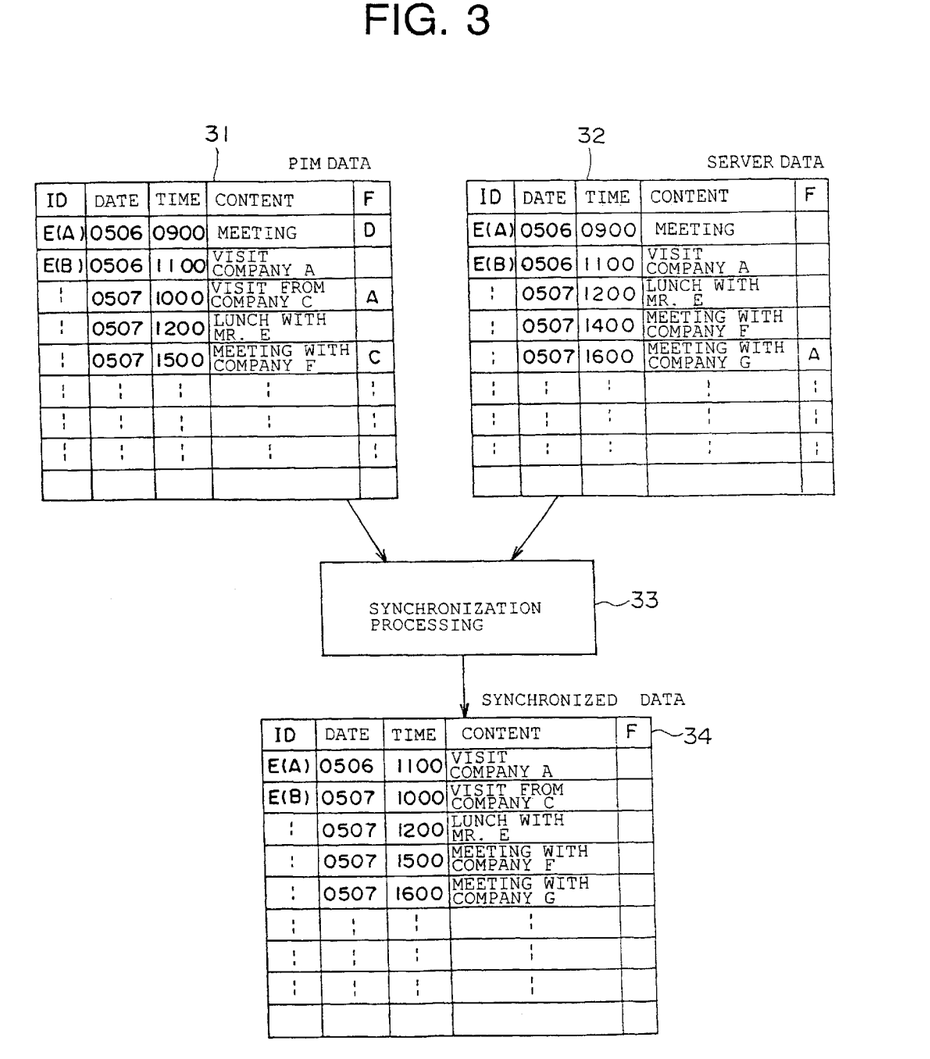
FIG. 3 is a diagram for explaining generation of synchronized data by synchronization processing of PIM data and server data in accordance with the embodiment.

An explanation of a concrete example of synchronization is made with reference to FIG. 3. In FIG. 3, reference numeral 31 refers to PIM data read from the PIM 1, and reference numeral 32 refers to server data read from the server 2. This example is an example of schedule data, and is made up of items each pertaining to an ID, date, time, content and a flag "F". The flag "F" indicates deletion (D), addition (A) and alteration (C) of data, respectively. That is, schedule data for a meeting starting at 09:00 hours on May 6 was deleted from the PIM 1; therefore, a flag (D) has been registered. Also, schedule data regarding a "visit from company C" at 10:00 hours on May 7 was added onto the PIM 1 (flag A). Additionally, data regarding a "meeting with company F" at 15:00 hours on May 7 indicates that the time was altered from 14:00 hours to 15:00 hours (flag C).

On the other hand, a "meeting with company G" at 16:00 hours on May 7 has been added as schedule data in the server data 32 (flag A).

In synchronization processing 33 performed by a synchronization processing program 4, the PIM data 31 (or the server data 32) is processed so that data having a flag as described above is made to be reflected in the other data. In other words, schedule data having the D flag is deleted in synchronized data 34, and schedule data set with the A flag is registered in the synchronized data 34 as is. When schedule data is set with the C flag, the data on the side that is set with the flag is registered in the synchronized data 34 with priority.

In this way, the synchronizing processing 33 is performed, and the synchronized data 34 having no inconsistencies is generated. This synchronized data 34 is written to the PIM 1 via the PIM access program 3, and is also stored in the synchronized data storage region 7 of the main memory 6 of the server 2. Also, the synchronized data 34 stored in the synchronized data storage region 7 is written to the server 2 via the server access program 5. In this case, this process of writing the synchronized data 34 to the server 2 is performed independently of the above-described process of writing the synchronized data 34 to the PIM 1. Therefore, even when a delay occurs in the writing of the data to the server 2 side, there is no influence on the process of writing data to the PIM 1.

Figure 4:
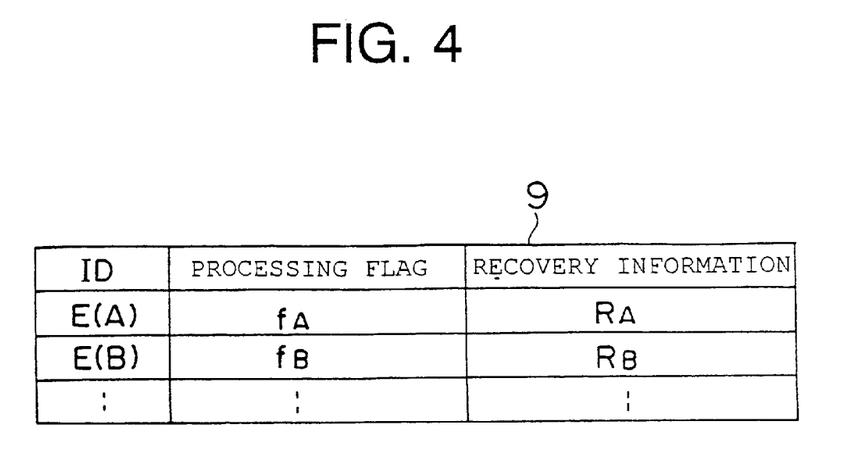
FIG. 4 is an explanatory diagram showing data items of a recovery object list in accordance with the embodiment.

On the other hand, a recovery object list 9 provided inside the auxiliary storage device 8 of the server 2 is a list compiled when an error occurs upon writing the data to the server 2. As shown in FIG. 4, this recovery object list 9 is made up of an ID, a processing flag and restoration information. The ID here is for uniquely identifying the data, and also shows what type of process (addition, alteration, deletion, and the like) was being performed at the time when the error occurred. A value is stored for indicating the process that should be carried out when each piece of data is restored. Also, information of such as items that will be necessary upon performing the restoration processes indicated by the processing flags are stored as the restoration information.

The device is configured such that when an error occurs while writing data to the server 2, the server access program 5 records the necessary items in the above-mentioned recovery object list 9. The next time that synchronization processing is performed, namely when the server access program 5 writes data to the server 2, the server access program 5 references the recovery object list 9 and makes another attempt to write the data where the error has recurrently occurred.

Figure 5:
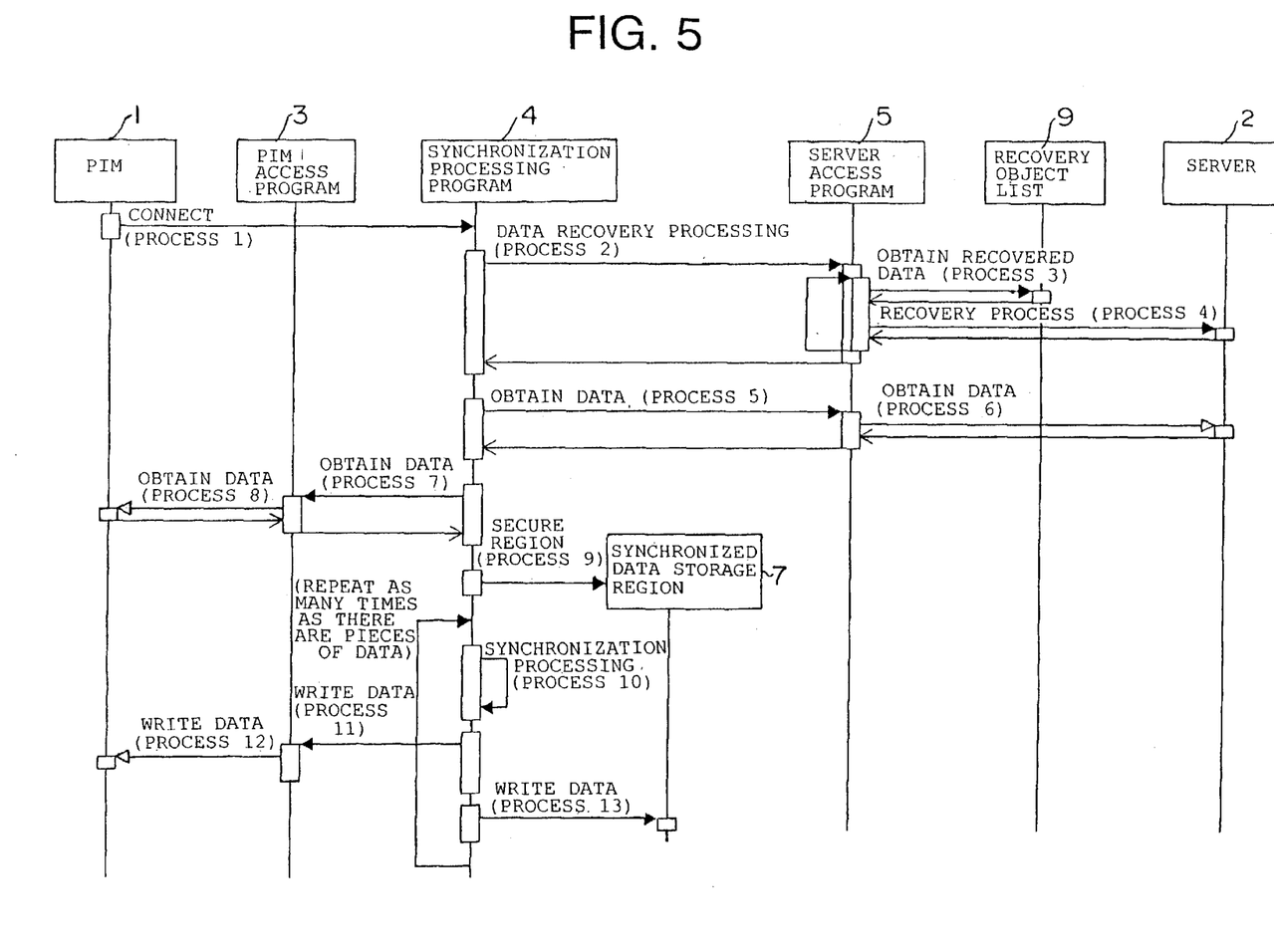
FIG. 5 is a sequence diagram (1) showing a procedure for synchronization processing in accordance with the embodiment.
Figure 6:
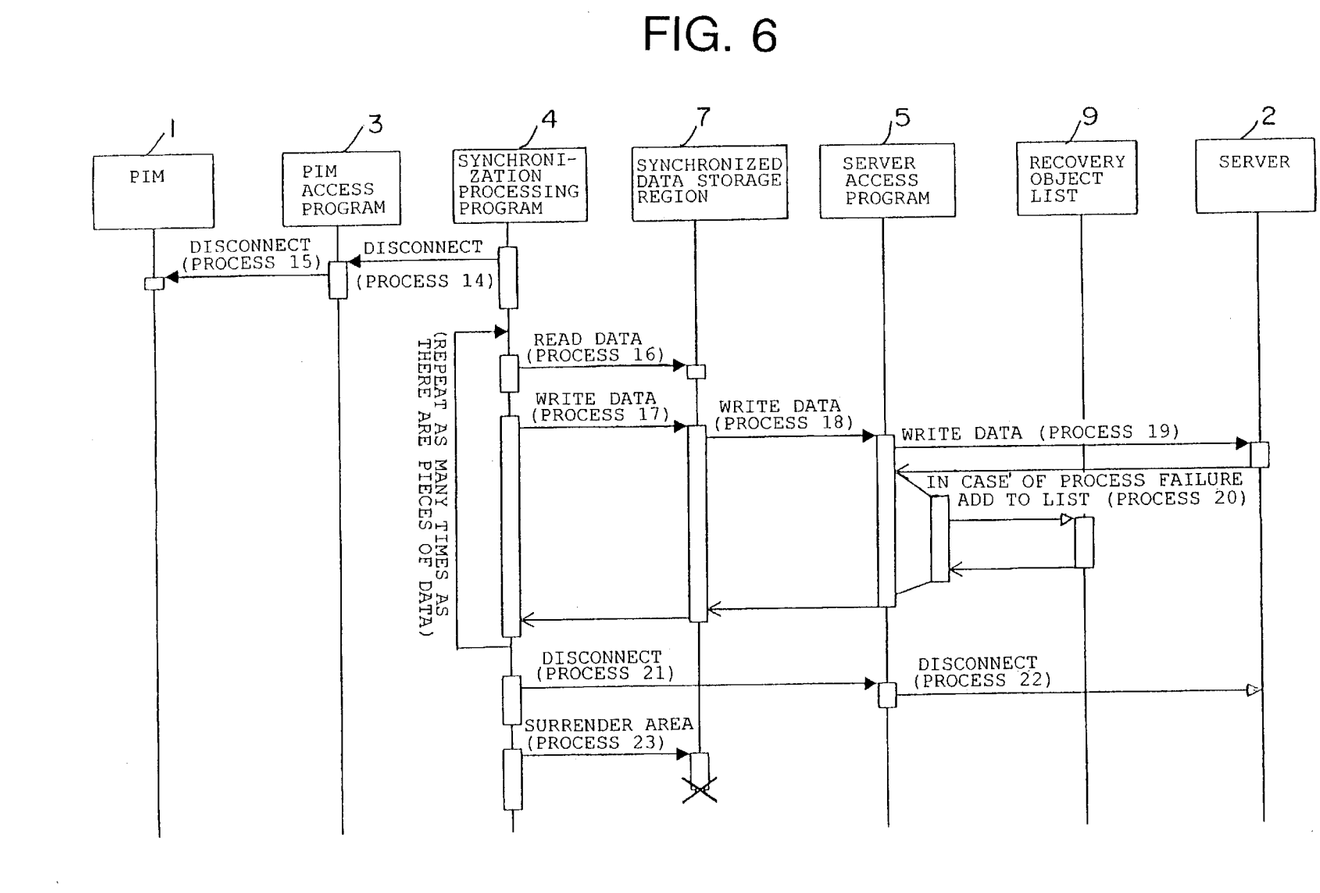
FIG. 6 is a sequence diagram (2) showing another procedure for synchronization processing in accordance with the embodiment.

Next, explanation is made with reference to FIGS. 5 and 6 of the procedure for the synchronization processing described above.

First, the synchronization processing begins by the PIM 1 issuing a connection request to the synchronization processing program 4 (process 1). The synchronization processing program 4 receives the connection request from the PIM 1 and, at that point, in order to retry the processes in respect to the server access program 5 which could not be carried out the previous time of synchronization in respect to the server 2 (forwarding errors, etc.), the synchronization processing program 4 requests the server access program 5 to perform a recovery process (process 2).

Based on this, the server access program 5 accesses the recovery object list 9 inside the auxiliary storage device 8 (process 3).

Next, the server access program 5 performs the process designated by the recovery object list 9 (process 4).

When the server access program 5 completes the above-mentioned recovery process, the synchronization processing program 4 obtains the data of the server 2 (server data 32) via the server access program 5 (processes 5 and 6). Additionally, the synchronization processing program 4 obtains the data of the PIM 1 (PIM data 31) via the PIM access program 3 (processes 7 and 8).

Next, the synchronization processing program 4 secures the synchronized data storage region 7 in the main memory 6 of the server 2 (process 9). The synchronization processing program 4 then performs synchronization process 33 of the PIM data 31 and the server data 32, and the synchronized data 34 is generated. This synchronization process is actually performed for each data (each schedule entry in FIG. 3) (process 10). In this way, the synchronization processing program 4 writes the synchronized data one by one to the PIM 1 (processes 11 and 12), but does not directly write to the server 2. Instead, the synchronization processing program 4 generates the synchronized data 34 as shown in FIG. 3, stores the synchronized data 34 in the synchronized data storage region 7, and adds data to this synchronized data 34 each time the synchronization of each data is completed. This processing is repeated as many times as there are pieces of data, and when processing of all of the data has been completed, the synchronization processing program 4 outputs a disconnect request to the PIM 1 (processes 14 and 15). At this point the PIM 1 is released from this system. In other words, after this point the user can freely operate the processing by the PIM 1 on the terminal device 22 (for example, the user can conduct new input, alteration or deletion of the schedule).

Next, the synchronization processing program 4 writes the synchronized data 34 of the synchronized data storage region 7 to the server 2. This process is conducted as follows.

First, the synchronization processing program 4 accesses the synchronized data storage region 7 and conducts the initial reading of the data (process 16). Then the synchronization processing program 4 transfers the data read therein to the server access program 5 (process 18). The server access program 5 writes the received data to the server 2 (process 19). At this point, in the case that an obstruction has occurred such that the data cannot be written to the server 2, the data is added to the recovery object list 9 (process 20). This data that has been added to the recovery object list 9 is written to the server 2 in the above-described restoration process (processes 2 to 4) the next time the server 2 is accessed.

In this way, when all the synchronized data 34 has been written to the server 2, the synchronization processing program 4 outputs a disconnect request signal to the server 2 (processes 21 and 22) and then releases the synchronized data storage region 7 (process 23).

What is claimed is:

1. A data synchronization device for performing synchronization of data between devices retaining data, said data synchronization device having a synchronization process unit for comparing a first set of data retained in a first device with a second set of data retained in a second device and generating synchronized data;
    a first access unit sequentially updating the first set of data based on the synchronized data each time a synchronized data is generated, and releasing the first device from the synchronization process when updating of the first set of data based on all the synchronized data is complete;
    wherein the first device and the second device are connected via a network;
    the first access unit disconnects a connection of a network in the first device after the updating of the first set of data based on all the synchronized data is complete;
    wherein the second access unit records obstructed information in an obstructed information storage unit when an obstruction has occurred while updating the second set of data; and
    the second set of data is updated based on the obstructed information when other synchronization processes are performed in advance of these other synchronization processes.

2. A data synchronization device according to claim 1 comprising a data writing unit sequentially storing the synchronized data in a storing unit each time the synchronized data is generated; and
    a second access unit reading the synchronized data stored in the storage unit after all the synchronized data has been generated, and updating the second set of data.

3. A data synchronization device according to claim 1 for synchronizing personal management data included in each set of data, wherein the first set of data is data used in a personal management program and the second set of data is data used in a group management program.

4. A data synchronization method for performing synchronization of data between devices retaining data, said data synchronization method comprising:
    comparing a first set of data retained in a first device with a second set of data retained in a second device and generating synchronized data;
    sequentially updating the first data based on the synchronized data each time synchronized data is generated;
    releasing the first device from the synchronization process after updating of the first set of data based on all the synchronized data is complete;
    recording obstructed information to an obstructed information storage unit when an obstruction occurs during the updating of the second set of data; and
    updating the second set of data based on the obstructed information when other synchronization processes are preformed in advance of these other synchronization processes.

5. A data synchronization method according to claim 4 comprising:
    sequentially storing the synchronized data in a storage unit each time synchronized data is generated; and
    reading the synchronized data stored in the storage unit and updating the second set of data after all the synchronized data has been generated.

6. A data synchronization method according to claim 4, wherein
    the first device and the second device are connected via a network, and
    the fist device is disconnected from the network after the updating of the first set of data based on all the synchronized data is complete.

7. A data synchronization method according to claim 4 for synchronizing personal management data included in each set of data, wherein the first set of data is data used in a personal management program and the second set of data is data used in a group management program.

8. A computer readable storage medium storing a data synchronization program for performing synchronization of data between devices retaining data, said data synchronization program being a program for causing a computer to perform the functions comprising:
    comparing a first set of data retained in a first device with a second set of data retained in a second device, and generating synchronized data;
    sequentially updating the first set of data based on the synchronized data each time synchronized data is generated;
    releasing the first device from the synchronization process after updating of the first set of data based on all the synchronized data is complete;
    recording obstructed information to an obstructed information storage unit when an obstruction occurs during the updating of the second set of data; and
    updating the second set of data based on the obstructed information when other synchronization processes are performed in advance of these other synchronization processes.

9. A computer readable storage medium storing the program according to claim 8 for causing the computer to perform the functions comprising:
sequentially storing the synchronized data in a storage unit each time the synchronized data is generated; and
reading the synchronized data stored in the storage unit and updating the second set of data after all the synchronized data is generated.

10. A computer readable storage medium storing the program according to claim 8, wherein the first device and the second device are connected via a network, and said program disconnects the first device from the network after the updating of the first set of data based on all the synchronized data is complete.

11. A computer readable storage medium storing the program according to claim 8 for synchronizing personal management data included in each set of data, wherein the first set of data is data used in a personal management program and the second set of data is data used in a group management program; and personal management data included in each set of data is synchronized.

* * * * *